United States Patent
Demirekler et al.

(10) Patent No.: US 7,292,639 B1
(45) Date of Patent: Nov. 6, 2007

(54) METHOD AND APPARATUS FOR PEAK TO AVERAGE POWER RATIO REDUCTION FOR ORTHOGONAL FREQUENCY DIVISION MULTIPLEX SYSTEMS

(75) Inventors: Levent Demirekler, Columbia, MD (US); Aleksandar Purkovic, Potomac, MD (US)

(73) Assignee: Nortel Networks Limited (CA)

( * ) Notice: Subject to any disclaimer, the term of this patent is extended or adjusted under 35 U.S.C. 154(b) by 924 days.

(21) Appl. No.: 10/455,513

(22) Filed: Jun. 5, 2003

(51) Int. Cl.
*H04K 1/10* (2006.01)
*H04L 25/08* (2006.01)

(52) U.S. Cl. ........................................ 375/260; 375/346
(58) Field of Classification Search ................ 375/260, 375/264, 285, 296, 346
See application file for complete search history.

(56) References Cited

U.S. PATENT DOCUMENTS

| | | | |
|---|---|---|---|
| 6,366,555 B1 * | 4/2002 | Gatherer et al. ............ 370/210 |
| 6,674,810 B1 * | 1/2004 | Cheng ........................ 375/296 |
| 7,136,423 B1 * | 11/2006 | Duvaut et al. .............. 375/260 |
| 2002/0176510 A1 * | 11/2002 | Laroia ........................ 375/267 |
| 2003/0189893 A1 * | 10/2003 | Richardson ................. 370/208 |

* cited by examiner

*Primary Examiner*—Don N. Vo
(74) *Attorney, Agent, or Firm*—McGuinness & Manaras LLP

(57) ABSTRACT

A multi-stage signal processing method is provided that reduces the Peak to Average Power Ratio (PAPR) of an Orthogonal Frequency Division Multiplexed (OFDM) signal without increasing the bit error rate of the system. The multi-stage processing system apportions the tones into a number of types, and processes the tones in an order and by a process consistent with their determined type. Advantageously, preprocessing of the time domain signal may be used to condition the data tones for optimal PAPR reduction during the multi-stage process.

28 Claims, 8 Drawing Sheets

METHOD AND APPARATUS FOR PEAK TO AVERAGE POWER RATIO REDUCTION FOR ORTHOGONAL FREQUENCY DIVISION MULTIPLEX SYSTEMS

FIELD OF THE INVENTION

The invention relates generally to the field of communications and more particularly to a method and apparatus for Peak to Average Power Ratio (PAPR) reduction for Orthogonal Frequency Division Multiplex (OFDM) signals.

BACKGROUND OF THE INVENTION

Orthogonal Frequency Division Multiplexing (OFDM) is a technology that runs on the principle of transmitting data by dividing the data stream into multiple parallel bit streams that have a much lower bit rate, and using the sub-streams to modulate several carriers. In OFDM, the frequency band of interest is divided into a number of smaller bandwidth carriers, or sub-carriers. The sub-carriers are orthogonal, which means that each sub-carrier can be separated out at the receiver without interference from the other sub-carriers. By dividing the frequency band into a large number of narrow band carriers, wireless channel impairments are significantly reduced.

OFDM offers many advantages for digital data transmission, and has been adopted into standards in several outdoor and indoor high speed wireless and wire line data applications, including wireless local area networks, wireless local loops, digital audio and video broadcasting and digital subscriber lines. The primary drawback of OFDM is a high Peak-to-Average Power Ratio (PAPR) of the transmitted signal. The cost of a transceiver can depend on the dynamic range of its signals. A high PAPR requires a very large dynamic range at the transceiver to represent, transmit, and receive the signal. A High Power Amplifier (HPA) would thus be required to transmit the signal without distortion.

In order for the HPA to cleanly pass on the analog signal it must be able to handle occasional large peaks. However an HPA that can handle large peaks is large and generally consumes a lot of power. To reduce the cost and size of the amplifier, the peak power needs to be reduced. Two things can be done to reduce the peak power. The peak power could be reduced by reducing the overall average power. However, this reduces the Signal to Noise Ratio (SNR) of the system and the power efficiency of the transmitter, and is not a desirable solution. The second solution is to use an HPA which cannot handle large peaks, (thereby clipping the signal) and simply allow the non-linearities to be propagated to the receiver, thereby reducing the Bit Error Rate (BER) performance of the system.

Such a solution is not desirable.

DETAILED DESCRIPTION

Figure 1:
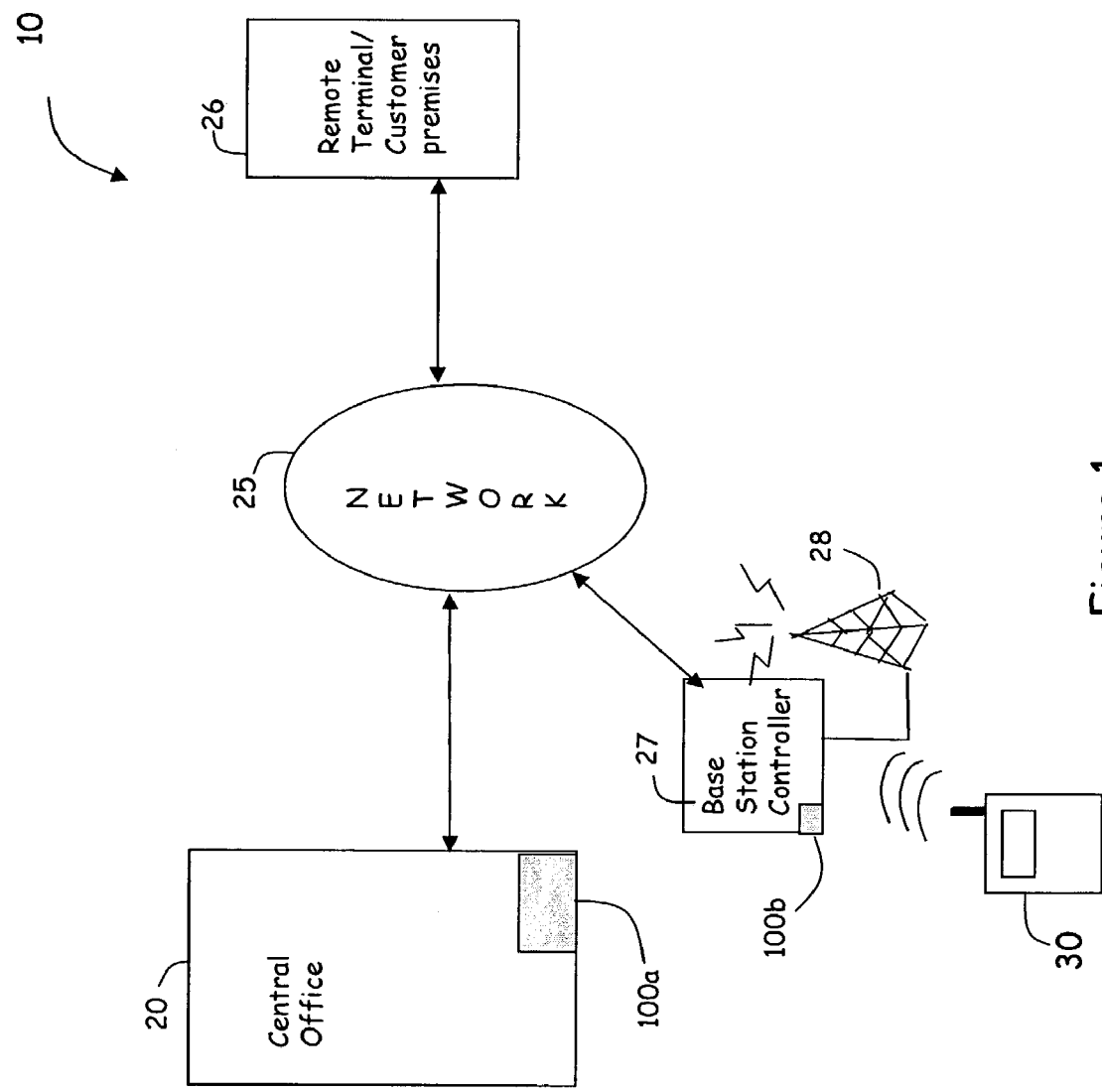
FIG. 1 is a block diagram of a network system that illustrates the communication of various wireless and wire-line devices over a network.

According to the principles of the present invention, a multi-stage signal processing method and apparatus reduces the Peak to Average Power (PAPR) ratio of a transmitted OFDM signal while maximizing Bit Error Rate performance. The multi-stage processing method and apparatus is intended for use in any OFDM transmission device. For example, FIG. 1 illustrates a networked system comprised of both wireless and wire-line devices. For example, a central office 20 supporting an Asymmetric Digital Subscriber Line (ADSL) interface, which may use OFDM, may be connected to a remote terminal 30 via a network 25. Additionally, a base station/controller pair 27/28 may be connected to the network 25 to provide 3G+wireless communication with a mobile device 30. Each transmitting OFDM device, such as the central office 20 or the base station controller 27 may include the modified OFDM transmitter 100a, 100b of the present invention.

While exemplary components have been shown in FIG. 1, it should be noted that the present invention is not limited to the use of any particular type of OFDM transmission device. Multi-carrier communication systems are also used in coded OFDM (CODFM) for digital audio broadcasting. CODFM is becoming the basis of high-definition television broadcasting. Emerging high-rate wireless standards, such as 802.11a, 802.16a and Hiperlan/2 use OFDM as their modulation scheme as well. The present invention may therefore be used in a variety of technologies and configurations.

Figure 2:
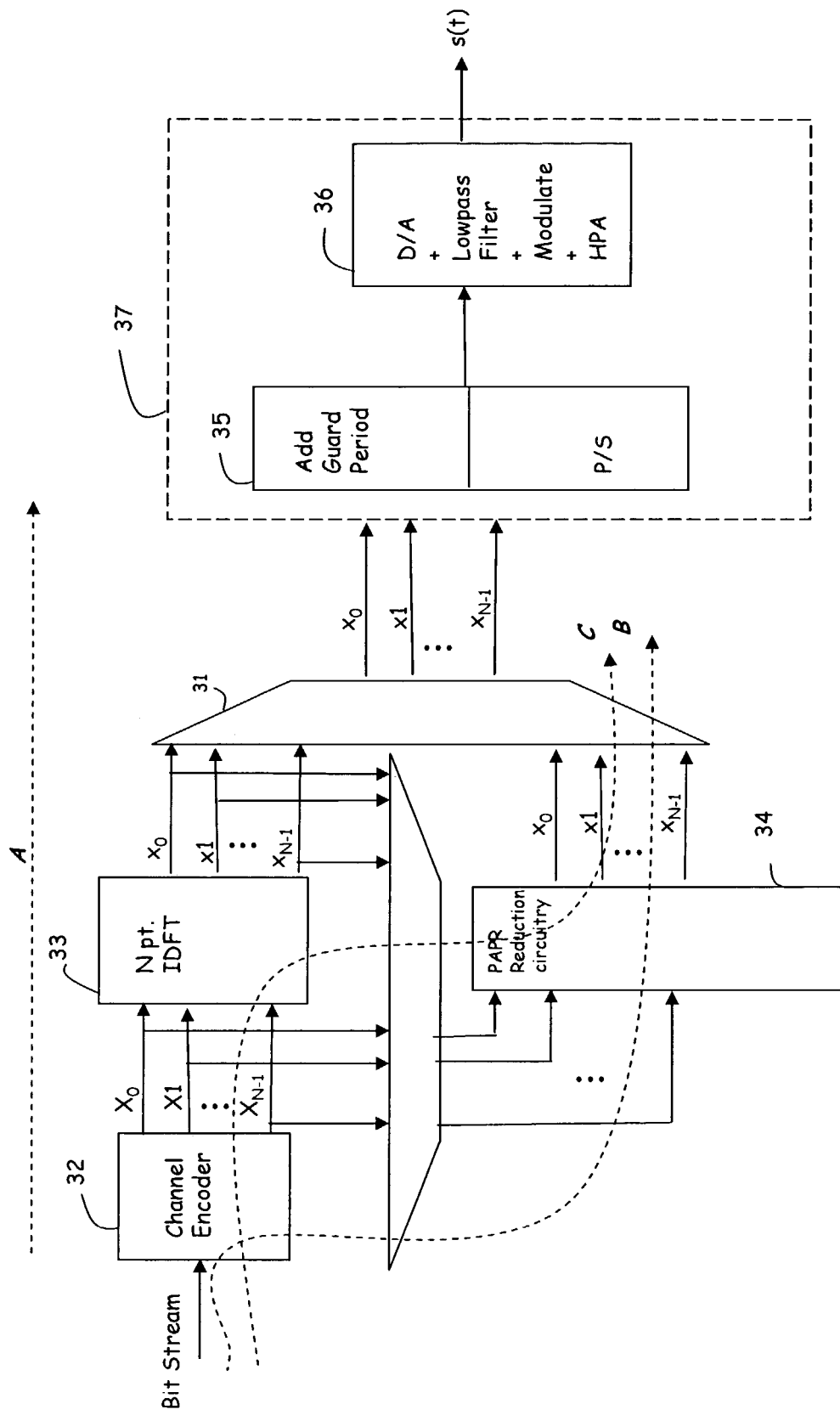
FIG. 2 is a block diagram illustrating exemplary components of an Orthogonal Frequency Division Multiplexing (OFDM) transmitter, including Peak to Average Power Ratio (PAPR) reduction circuitry according to the present invention.

Referring now to FIG. 2, an exemplary block diagram of an OFDM transmitter according to the present invention is provided. In the figures, X is a vector of size N, corresponding to the constellation points of an OFDM symbol, which uses N subcarriers. 'x' is a vector of size N corresponding to the time domain signal after modulation, and is denoted by below equation (1):

$$x = F^* X \quad (1):$$

Where F is the N×N Discrete Fourier Transform matrix and * denotes conjugation. The OFDM transmitter of FIG. 2 includes a channel encoder 32 which splits the data into the N frequency bins, or subchannels. The output parallel symbol stream X undergoes an N-point Inverse Discrete Fourier transform (IDFT) for modulation. Transmitted bits are mapped onto constellation points for each subcarrier.

In general, the time-domain signal provided by the IDFT circuit 33 is not sufficient for reliable transmission because channel distortion may cause interference between neighboring blocks of the time domain outputs. Commonly, to alleviate this problem, at block 35 a guard interval of length v is inserted in the form of a cyclic prefix, which takes the last v time domain samples and inserts them at the beginning of the block. At block 36 the time-domain signal is then converted into an analog signal, filtered, modulated to the desired carrier frequency, passed through HPA and sent across the channel.

In FIG. 2, a number of datapaths A, B and C are shown indicated by dashed lines. Datapath A essentially represents a prior art datapath with no PAPR reduction, and thus frequency domain signals travel from an input, through the channel encoder 32, to the IDFT circuit 33, to block 35 and out.

As mentioned above, one problem with the OFDM signal is that the high Peak to Average Power Ratio (PAPR) of the resultant time domain signal may be so great that HPA operation of block 36 may distort the transmitted signal if the linear operating range of HPA is low. To overcome this problem, according to one aspect of the invention Datapaths B or C may be used, each of which include PAPR reduction circuitry 34. PAPR circuitry 34 is utilized to modify the time domain signal to reduce distortion. A difference between datapath B and C lies in whether the frequency domain or time domain signal is fed to the PAPR reduction circuitry, and the operation of the PAPR reduction circuitry in each of these datapaths is described in more detail below. In datapath B, the frequency domain signal is forwarded from channel encoder 32 to the PAPR reduction circuitry 34, and then to the guard interval insertion circuit 35. Using datapath C, the time domain signal received from the IDFT circuit 33 is forwarded as input to the PAPR reduction circuitry 34. The PAPR operation of the PAPR reduction circuitry 34 will now be described in more detail.

PAPR Reduction Process

According to one aspect of the invention, a multi stage time-frequency algorithm application is used to provide an output signal having a desirable PAPR. In one embodiment, the multi-stage time-frequency algorithm utilizes a combination of Projection onto Convex Sets (POCS) signal processing algorithm followed by an Active Constellation Extension (ACE) signal processing algorithm (or alternatively the Gradient Projection ACE signal processing algorithm described in more detail below) to achieve the optimal signal. Before discussing how the present invention combines these processes, a brief description of these algorithms will first be provided.

Projection onto Convex Sets (POCS)

POCS is a tone reservation signal processing algorithm that iteratively projects the 'peaky part of the signal onto reserved tones. POCS is described in detail in the reference "Controlling Clipping Probability in DMT Transmissions' by A. Gatherer and M. Polly, *Proceedings of the 31$^{st}$ Asilomar Conference on Signals, Systems, and Computers,* 1997, pp. 578-584, incorporated herein by reference.

In Asymmetric Digital Subscriber Line (ADSL) systems, the OFDM signal rarely uses all of the bandwidth. In fact it is often the case that the top portion of the available bandwidth carriers little or no data, and after bit allocation there is a set of tones L that carries little or no data. These tones correspond to a set of L elements in the data vector that carry no data, which is referred to as the unused set. A subspace $S_x$ is defined as the space of all vectors whose L elements in the unused set are zero.

Figure 3:
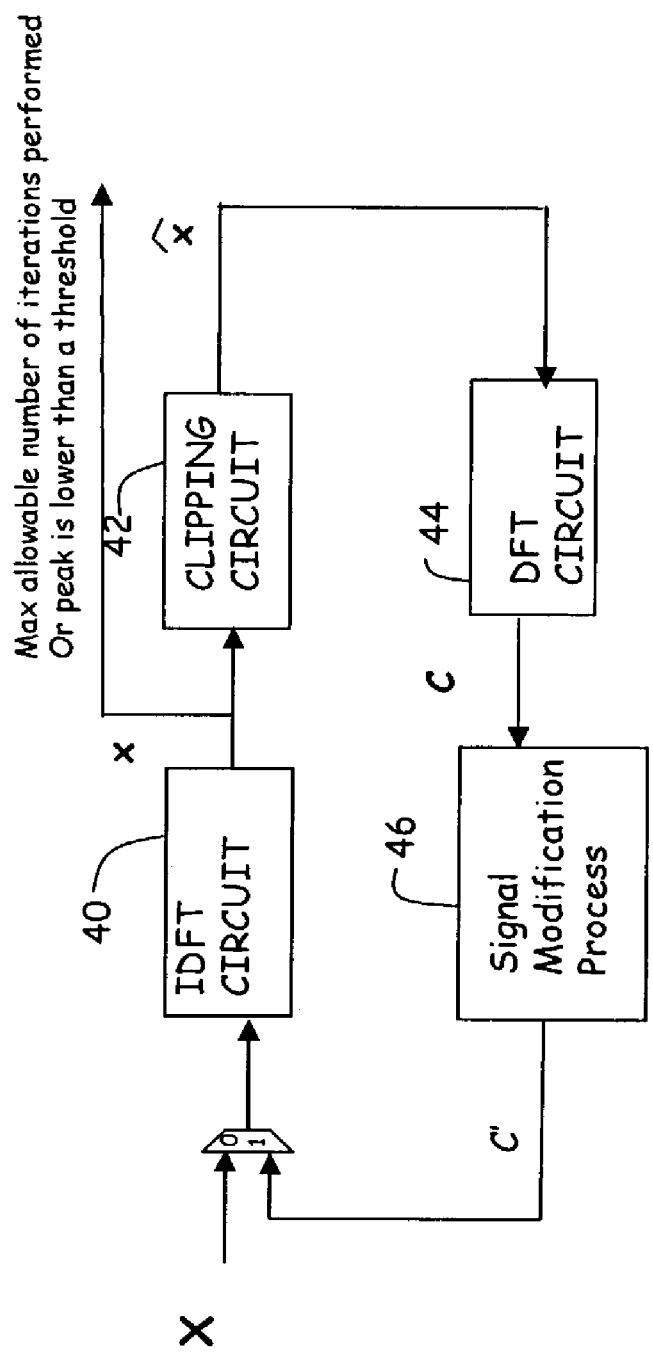
FIG. 3 is a block diagram of one embodiment of the signal modification circuitry of PAPR reduction circuitry of FIG. 2.

The goal of POCS is to keep the magnitude of all elements of x (defined in equation (1)) below a threshold. To achieve this goal, the effect of clipping is pushed into the unused set $S_x$. In FIG. 3, a block diagram is provided for illustrating when the signal modification process of POCS is applied to the clipped time domain signal $\hat{x}$. At block 40 the frequency domain signal X is modulated using IDFT, to provide the time domain signal x. Clipping circuit 42 filters x to determine whether any of the elements of x exceed the maximum clipping threshold, providing $\hat{x}$. If one or more elements exceed the threshold (and a maximum number of iterations has not been performed), the process proceeds to block 44, where $\hat{x}$ is DFT'd to provide the updated frequency domain signal C. Note that, at this point, the frequency domain signal C reflects the clipped value of x for all elements N. Signal C is forwarded to the signal modification process 46, which modifies the signal according to a selected algorithm to provide a frequency domain signal C'. Subsequent iterations through the signal modification process use the modified C' frequency domain signal as input.

Figure 4:
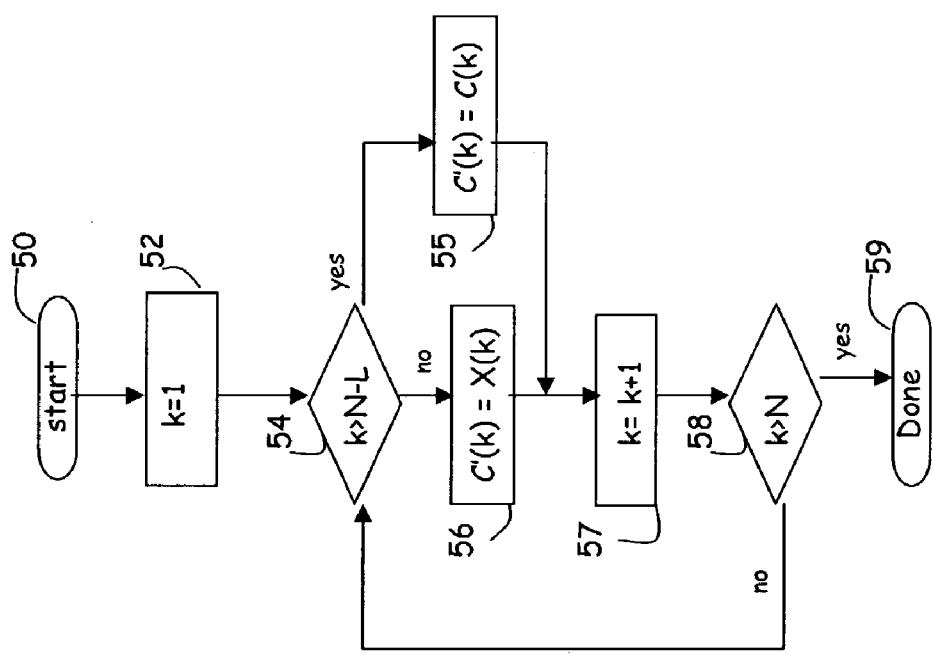
FIG. 4 is a flow diagram illustrating various steps of a Project onto Convex Sets (POCS) time-frequency processing method.

Referring to FIG. 4, a flow diagram illustrates the stages that are taken during POCS signal modification process 46. Processing of the frequency domain signal is performed differently if the signal is a data signal in a used channel, or a noise signal in an unused channel Assuming that there are N subchannels, L of which are unused subchannels, steps 56, 57 and 58 are used to restore the N-L elements to their original data values in X. Once all the used tones have been restored to their original data values, steps 55, 57 and 58 are used to step through the remaining unused channels, to retain the modified noise signal in the unused channel. That is, the subchannel values in the unused set $S_x$ retain the value of C. Subsequent to POCS processing, certain data values have been added to the unused set, with the intent that the values balance out the PAPR of the overall signal. Once all of the N elements have been processed, the POCS procedure is complete, and the frequency domain signal C' is available.

The effectiveness of POCS depends on a number of factors including the number of reserved tones, the location of reserved tones, and the computational resources available to the PAPR processing. As mentioned previously, POCS is best used for systems such as ADSL, which have some unused tones. However, for wireless OFDM systems, POCS may not be the best alternative because of the reservation of tones for PAPR cancellation reduces the available channels for communication.

Active Constellation Extension (ACE)

The Active Constellation Extension (ACE) process may be performed as an alternate to POCS at the signal modification process 46 of FIG. 3. Rather than reserve tones as proposed in POCS, ACE modifies the values of all tones such that a minimum distance between constellation points is not decreased.

Figure 5:
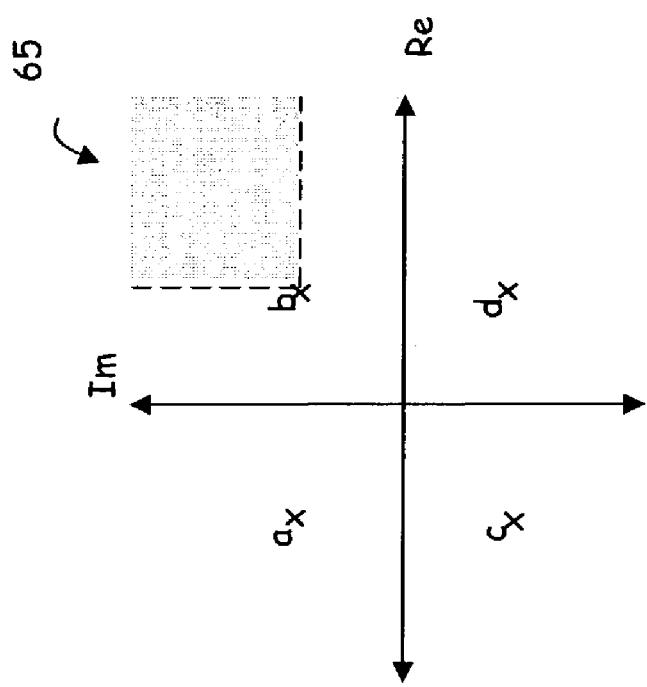
FIG. 5 is a diagram illustrating the positioning of constellation points in an Active Constellation Extension (ACE) signal processing method.

Active Constellation Extension (ACE) is described in detail in *"Peak Power Reduction in OFDM and DMT via Active Channel Modification"*, 33$^{rd}$ Asilomar Conference, Vol. 2, 1999, pp. 1076-1079, incorporated herein by reference. Referring briefly to FIG. 5, the principles of ACE can be described. For each individual subchannel, using flat power OFDM and Quadrature Phase Shift Keying (QPSK) modulation, there are four possible constellation points onto which the transmitted bits could be mapped. As shown in FIG. 5, for each individual subchannel there are four possible constellation points, a, b, c and d which lie in each quadrant in the complex plane and are equidistant from the real and imaginary axes. Assuming white Gaussian noise and hard decoding the decision regions are the four quadrants bounded by the axes, and thus a received data symbol is assigned according to the quadrant in which the symbol is observed.

Because only one of the four constellation points can be transmitted at a time, and assuming white Gaussian noise and hard decoding, errors may occur when noise translates the received sample into one of the other three quadrants. Any point that is farther from the decision boundaries than the nominal constellation point (in the proper quadrant) will offer increased margin, thereby decreasing Bit Error Rate (BER). In ACE, modification of the constellation points within the quarter plane outside the nominal constellation point (i.e., for example in area 65 for constellation point b in FIG. 5) are permitted. For an OFDM system, the effect of moving into the shaded region is to add additional co-sinusoidal and/or sinusoidal signals at the particular subchannel frequency to the transmitted signal. If adjusted correctly, a combination of these signals can be used to partially cancel time-domain peaks in the transmitted OFDM signal.

A variation of ACE is Gradient Project (GP) algorithm. GP-ACE is an iterative algorithm, where modifications are made to the clipped portion c of the time domain signal x, and the modifications are made on an iterative basis by stepping through the clipped portion of the signal according to some defined step size μ.

Figure 6:
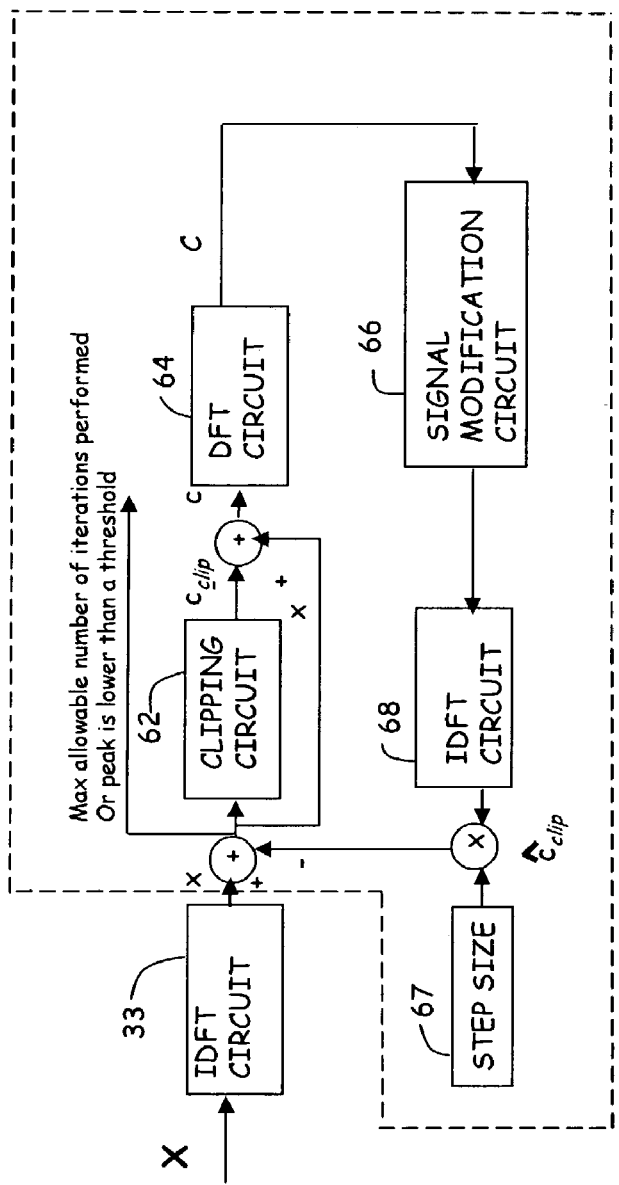
FIG. 6 is a functional flow diagram for illustrating the operation of Gradient Projection ACE.

Referring now to FIG. 6, a functional flow diagram of the GP-ACE process is shown. In this example, referring briefly to FIG. 1, datapath C (FIG. 2) is used, and where X represents an N channel frequency domain signal, x is the time domain representation after the IDFT of 33 has been performed, $c_{clip}$ is the clipped representation of x and c is the time domain signal obtained by subtracting $c_{clip}$ from x, and thus represents only the portion of x that was clipped at 62.

At each iteration of GP-ACE, the following steps are performed. First, the time domain signal x is clipped according to a threshold by clipping circuit 62, and the resulting $c_{clip}$ is subtracted from x to obtain c. Discrete Fourier Transform process 64 is performed, to obtain C, the frequency domain version of the clipped portion of x. At step 66 the ACE signal modification process is performed, where the constellation point of the signals are modified such that a minimum distance between the constellation points is maintained, and thus the minimum spacing between constellation points of a subchannel is not decreased. At step 68 IDFT is performed to obtain the time domain representation, and the step size is applied to the output of block 68, $\hat{c}_{clip}$. Thus, on a step size gradient, the constellation points of the subchannels may be modified to reduce the overall PAPR of the time domain signal.

Although ACE and GP-ACE provide lower PAPR with no overhead from reserving tones, the modification of the data tones by the ACE method increases the overall bit error rate of the system, possibly because it increases the average power of transmitted OFDM symbol, thus decreases BER performance for a given SNR (i.e. the increase in the average signal power is not used optimally in the sense that we could increase the minimum distance between constellation points instead of decreasing PAPR). Studies have shown that the more the constellation points are modified, the worse the overall bit rate performance becomes.

While ACE and POCS each have their limitations, according to the present invention a multi-step method of combining the two signal processing approaches integrates the benefits of both while minimizing the drawbacks of each to provide an improved PAPR reduction process. According to a first aspect of the invention, the available tones or subchannels, are apportioned into three categories; restricted tones, data tones and reserved tones. Restricted tones are those tones whose values cannot be changed due to system requirements. For example, the restricted tones may be pilot tones or tones that carry side information. Data tones are tones that carry data bits; their values are modified by following the ACE criteria. Reserved tones are tones that are explicitly reserved for PAPR reduction. In one embodiment, the number of reserved tones is limited to 5% of the overall available subchannels, although the number is a matter of design choice. Different factors to consider in selecting a number of tones to reserve for PAPR reduction include the overall desired performance and the design complexity of the transmitter. A larger number of reserved tones will take away from the number of channels available for communication, while a smaller number may not achieve the desired PAPR results.

According to a second aspect of the invention, the multistep signal processing method processes each tone in a specific manner depending upon the type of the tone. For restricted tones the original tone is preserved. Data tones are not modified during the first portion of the signal modification process, but are modified according to the ACE criteria during the second portion of the signal modification process. Tones that are specifically reserved for PAPR reduction are allowed to be modified on each iteration through the process.

In one embodiment of the invention there are two distinct processing stages; during a first processing stage, reserved tones are modified using a known time-frequency projection algorithm such as POCS, ACE, GP-ACE or the like. During the second processing phase, if PAPR has not been reduced to an acceptable level, data tones are modified using the ACE or GP-ACE method. Because POCS, ACE or GP-ACE modification is performed on the reserved tones, before being performed on the data tones, average power increase is less compared to POCS, ACE or GP-ACE for similar PAPR performance, and thus the overall Bit Error Rate (BER) is reduced.

Figure 7:
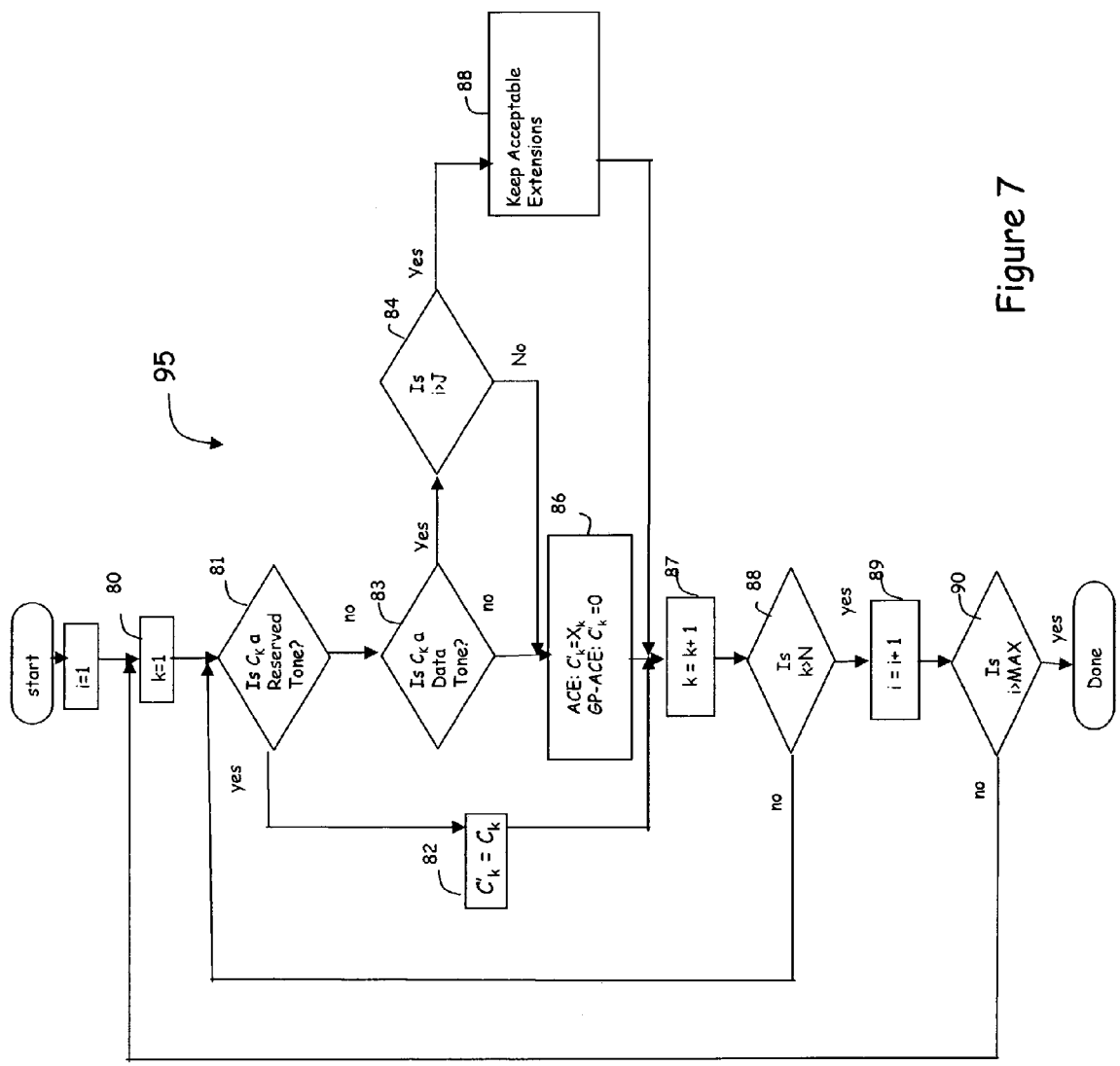
FIG. 7 is a flow diagram illustrating a multi-stage PAPR reduction process according to the present invention.

Referring now to FIG. 7, a flow diagram is provided illustrating exemplary steps in the PAPR reduction of the present invention. In particular, the multi-stage signal modification process may be performed (either at block 66 of the PAPR reduction circuitry of FIG. 6 or block 46 of the PAPR reduction circuitry of FIG. 3), with C and C' are vectors corresponding to the input and output of block 66/46. As mentioned above, the size of vectors C and C' is N (although it may be larger if oversampling techniques are used). In fact, oversampling by the signal by a factor of 2 in the PAPR algorithms is preferred. One method of oversampling is done by using a size 2N IDFT/DFT, instead of size N IDFT/DFT. For purposes of simplicity of description, however, the PAPR technique will be described as though no oversampling has been performed.

$C_k$ is the $k^{th}$ element of C. In FIG. 7, i represents the number of iterations of the signal modification process. The maximum number of iterations that the process undergoes is represented as MAX, and the number of iterations reserved for modifying only reserved tones (i.e., the first stage of processing) is J. (MAX-J would equal the number of iterations in the second stage of processing for modifying the data tones using the ACE or GP-ACE processes).

Thus, in FIG. 7, at step 80, k is set to 1 to start the process of stepping through the vectors. At step 81 it is determined whether $C_k$ is a reserved tone (i.e., reserved for PAPR). If it is, then at step 82, the value of $C_k$ is mapped to $C'_k$.

If at step 81 it was determined that $C_k$ was not a reserved tone, it is determined at step 83 whether it is a data tone. If it is a data tone, it is determined at step 84 whether the number of iterations associated with reserved tones has already been performed (i.e., whether the first stage of processing is compete). If the first stage of processing is not complete, or the tone was not a data tone, then at step 86, if ACE is being performed, the value of $C'_k$ is restored to the original value (i.e. $C'_k=X_k$). Otherwise, in the case of GP-ACE being performed, $C'_k$ is set to 0.

The first stage of processing continues with k being incremented, and the reserved tones being modified at step 82 until it is determined at step 84 that the first processing stage is complete. During the second stage of processing, when a data tone is detected at step 83, at step 88 the constellation points of the data tone extension are modified according to the GP-ACE (ACE) criteria, as described with regard to FIG. 6(3). The second stage of processing continues until at step 90 the maximum number of iterations has been completed. (It should be noted that the process of FIG. 7 may also be exited from at any time that the desired PAPR is achieved, as detected by the IDFT and clipping circuits).

Referring briefly to Table I below, a comparison of the performance of the multi-stage PAPR reduction process described in FIG. 7 versus GP-ACE or no PAPR reduction at all. The results obtained were the PAPR and Eb/No results for QAM 64 constellation.

TABLE I

| Signal Modification Process | PAPR (dB) at $10^{-4}$ sample clipping rate | Eb/No (dB) at $10^{-4}$ bit error rate |
| --- | --- | --- |
| No PAPR | 9.6 | 10.06 |
| GP-ACE 3 iterations | 7.45 | 11.0 |
| GP-ACE 3 iterations with present invention | 6.89 | 10.0 |

GP-ACE 3 iterations with present invention corresponds to using the time-frequency signal modification process of FIG. 7 in the block 66 of FIG. 6. In the example, 5% of the subcarriers were reserved for PAPR, with the locations selected arbitrarily, MAX equal three, J equal two. Thus, for the first two iterations, only the reserved tone values are modified and for the third iteration reserved and data tones are modified. Table I shows that the multi-stage method of the present invention achieves two goals; the overall PAPR and bit error rate are both reduced.

Figure 8:
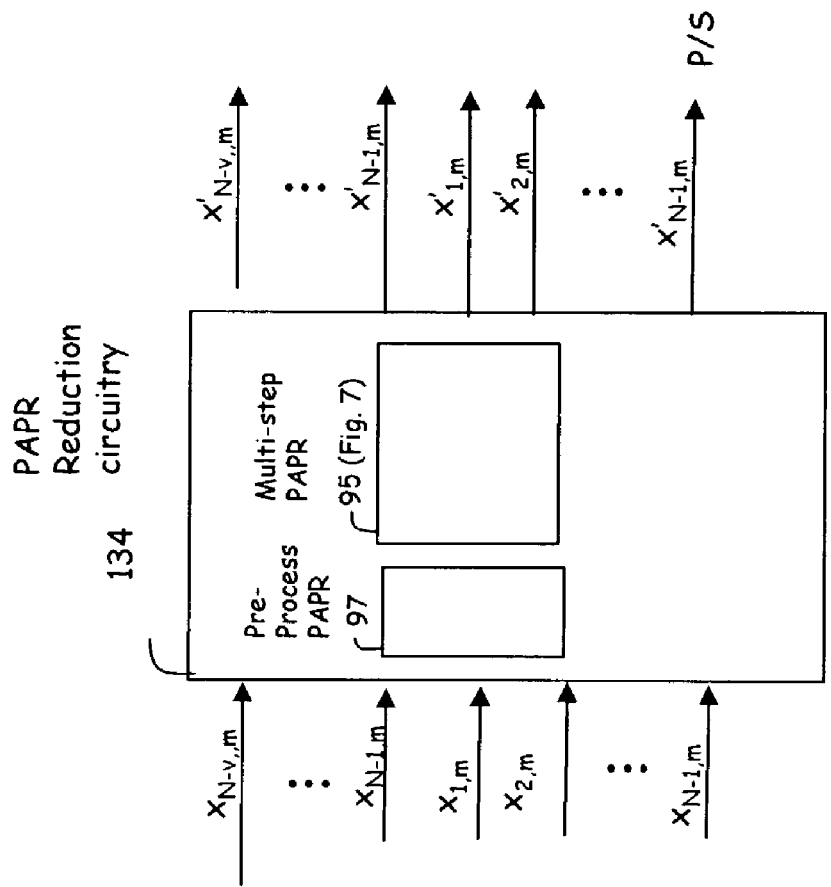
FIG. 8 is a block diagram illustrating additional components that may be included in PAPR reduction circuitry of FIG. 2.

Although the present invention has been described with regard to a two stage processing, it should be understood that the present invention is not limited to the application of only two stage PAPR reduction processes, but rather blends the advantages of multiple processes to obtain a desirable result. For example, according to a further embodiment of the invention, the performance of the present invention may be further enhanced by the addition of a pre-processing PAPR reduction process to the multi-stage PAPR of FIG. 7. Referring now to FIG. 8, a diagram of the PAPR reduction circuitry is shown to include two components; pre-processing circuit 97 and the multi-stage PAPR 95 of FIG. 7. In one embodiment, the pre-processing PAPR may be a Selective Mapping (SLM) or Partial Transmit Sequence (PTS) system. Although these techniques provide suboptimal results on their own, when used in combination with the multi-stage process of the current invention the PAPR reduction is enhanced.

Partial Transmit Sequence (PTS) processing is described in more detail in "*A Novel Peak Power Reduction Scheme for OFDM*", by S. H. Muller, J. B. Huber, $8^{th}$ IEEE Int. Symposium on PIMRC, 1997 pp. 1090-1094, incorporated herein by reference. In general, the PTS process subdivides the carriers into blocks, and applies a phase rotation to each block. For each set of applied phase rotation, the peak value of the OFDM symbol is calculated. The set of phase rotations that give a minimum peak value is selected, and applied to the OFDM symbol.

Selective Mapping (SLM) processing is described in more detail in "*Partial Transmit Sequence and Selected Mapping Schemes to Reduce ICI in OFDM Systems*", by K. Sathananthan and C. Tellambura, IEEE Communication Letters, August 2002, pp. 313-315, incorporated herein by reference. In general, the SLM process multiplies the OFDM symbol by a path vector, which corresponds to applying a phase rotation to each subcarrier as in PTS. For each path vector, the peak value of the OFDM symbol is calculated. The path vector that results in the minimum peak value is determined. The OFDM symbol is multiplied by the determined path vector prior to the application of the signal modification process of FIG. 7. In both PTS and SLM, tones are reserved to carry information regarding the phase rotation or the path vector; these tones would be restricted tones in the process of FIG. 7. By applying either SLM or PTS prior to the signal modification process of FIG. 7, the average power increase in data tones is reduced, thereby reducing BER for a given SNR.

Accordingly, a multi-stage signal processing method has been described that reduces the PAPR of an OFDM signal without increasing the bit error rate of the system. The multi-stage processing system apportions the tones into a number of types, and processes the tones in an order and by a process consistent with their determined type. Advantageously, preprocessing of the time domain signal may be used to condition the data tones for optimal PAPR reduction during the multi-stage process.

Having described various embodiments of the invention it is apparent that the invention may be realized in many forms, and should not be limited by the specific components, functional blocks or steps disclosed herein. Rather, the invention should only be limited by the scope and spirit of the attached claims.

What we claim is:

1. A method for reducing a Peak to Average Power Ratio (PAPR) of a signal, the signal comprising a plurality of tones, the plurality of tones apportioned into a set of data tones and a set of reserved tones, the method comprising the steps of:

modifying a signal value of at least one of the reserved tones according to a first processing method;

after the modification of the signal value of the at least one of the reserved tones, modifying a signal value of at least one of the data tones according to a second processing method to provide a modified signal; and transmitting the modified signal to a receiver.

2. The method according to claim 1, wherein the first processing method is a Projection onto Convex Sets (POCS) processing method.

3. The method according to claim 1 wherein the first processing method is an Active Constellation Extension (ACE) processing method.

4. The method according to claim 1, wherein the first processing method is a Gradient Project Active Constellation Extension (GP-ACE) processing method.

5. The method according to claim 1 wherein the second processing method is an Active Constellation Extension (ACE) processing method.

6. The method according to claim 1 wherein the second processing method is a Gradient Project Active Constellation Extension (GP-ACE) processing method.

7. The method according to claim 1, further comprising the steps of:

applying an Inverse Discrete Fourier Transform (IDFT) to an input signal OFDM signal to provide a time domain signal;

clipping the time domain signal to provide a clipped time domain signal; and applying a Discrete Fourier Transform (DFT) to the clipped time domain signal to provide a clipped frequency domain representation of the input signal.

8. The method according to claim 7, further comprising the step of oversampling the input signal.

9. The method according to claim 7, wherein the step of modifying the signal value of the at least one reserved tone replaces the signal value of the at least one reserved tone with the clipped frequency domain representation of the reserved tone.

10. The method according to claim 7, wherein the at least one data tone is from a set of at least two constellation points, and wherein step of modifying the signal value of the at least one data tone modifies a position of at least one constellation point of the at least one data tone while retaining a minimum distance between the at least two constellation points.

11. The method according to claim 7, wherein the plurality of tones further includes a set of restricted tones.

12. The method according to claim 11 further comprising the step of preserving the value of a restricted tone.

13. An Orthogonal Frequency Division Multiplexing (OFDM) transmitter comprising:

Peak to Average Power Ratio (PAPR) reduction circuitry comprising at least two stages, wherein a first stage of the PAPR reduction circuitry processes a first type of tones of an OFDM signal, a second stage of the PAPR reduction circuitry processes a second, different type of tones of the OFDM signal; and wherein the first stage of processing operates on the OFDM signal prior to the second stage operating on the OFDM signal.

14. The OFDM transmitter of claim 13, wherein the first type of tones are reserved tones and the first stage of PAPR reduction circuitry includes circuitry for performing Projection onto Convex Sets (POCS).

15. The OFDM transmitter of claim 13, wherein the first type of tones are reserved tones and the first stage of PAPR reduction circuitry includes circuitry for performing Active Constellation Extension (ACE).

16. The OFDM transmitter of claim 13, wherein the first type of tones are reserved tones and the first stage of PAPR reduction circuitry includes circuitry for performing Gradient Project Active Constellation Extension (GP-ACE).

17. The OFDM transmitter of claim 13 wherein the second type of tones is data tones and the second stage of PAPR reduction circuitry include circuitry for performing Active Constellation Extension (ACE).

18. The OFDM transmitter of claim 13, wherein the second type of tones is data tones and the second stage of PAPR reduction circuitry include circuitry for performing Gradient Project Active Constellation Extension (GP-ACE) processing method.

19. The OFDM transmitter of claim 13 wherein the OFDM signal further comprises restricted tones.

20. The OFDM transmitter of claim 13 further comprising:

IDFT circuitry for providing a time domain representation of the OFDM signal;

clipping circuitry for providing a clipped time domain representation of the OFDM signal;

DFT circuitry for providing a clipped frequency domain representation of the clipped time domain representation of the OFDM signal; and wherein the first stage of PAPR reduction circuitry replaces the reserved tones of the OFDM signal with the clipped frequency domain representation of the OFDM signal.

21. The OFDM transmitter of claim 13 further comprising:

IDFT circuitry for providing a time domain representation of the OFDM signal;

clipping circuitry for providing a clipped time domain representation of the OFDM signal;

DFT circuitry for providing a clipped frequency domain representation of the clipped time domain representation of the OFDM signal; and wherein the second stage of PAPR reduction circuitry modifies constellation points of the data tones of the OFDM signal.

22. The OFDM transmitter of claim 13 further comprising preprocessing circuitry for processing the OFDM circuitry prior to the PAPR reduction circuitry.

23. The OFDM transmitter of claim 22 wherein the preprocessing circuitry comprises circuitry for determining a set of phase rotation to apply to each one of the tones of the OFDM signal.

24. The OFDM transmitter of claim 22 wherein the preprocessing circuit includes circuitry to perform Partial Transmit Sequence (PTS) processing.

25. The OFDM transmitter of claim 22 wherein the preprocessing circuit includes circuitry to perform Selective Mapping (SLM) processing on the OFDM signal.

26. A method of allocating tones in a multicarrier communication system comprising the steps of:

designating a first set of tones as a reserved set of tones, the reserved set of tones being reserved for Peak to Average Power Ratio (PAPR) reduction;

designating a second set of tones as data tone;

reserving a third set of tones as restricted tones; and processing each type of tone of a received input signal by an OFDM transmitter in a different manner to provide an output signal with a desirable PAPR characteristic.

27. The method according to claim 26, wherein each reserved tone in the set of reserved tones is distributed randomly within the multicarrier signal.

28. The method according to claim 24, wherein the step of processing includes the step of oversampling the received input signal.

* * * * *